United States Patent [19]

Shimizu

[11] Patent Number: 5,245,594
[45] Date of Patent: Sep. 14, 1993

[54] DATA READ/WRITE SYSTEM FOR A DISC STORAGE UNIT

[75] Inventor: Haruyoshi Shimizu, Kawasaki, Japan

[73] Assignee: Fuji Electric Co., Ltd., Kawasaki, Japan

[21] Appl. No.: 941,310

[22] Filed: Sep. 4, 1992

Related U.S. Application Data

[63] Continuation of Ser. No. 523,552, May 15, 1990, abandoned.

[30] Foreign Application Priority Data

May 17, 1989 [JP] Japan .................. 1-123595

[51] Int. Cl.$^5$ .................. G11B 5/55; G11B 7/007
[52] U.S. Cl. .................. 369/32; 369/48; 369/54; 369/58; 360/48; 360/77.08; 395/400
[58] Field of Search .................. 369/32, 47, 48, 54, 369/58, 59; 360/48, 77.08; 395/400, 425

[56] References Cited

U.S. PATENT DOCUMENTS

| | | | |
|---|---|---|---|
| 4,145,745 | 3/1979 | De Bijl et al. | 395/400 |
| 4,188,662 | 2/1980 | Ishibashi | 364/200 |
| 4,669,004 | 5/1987 | Moon et al. | 369/48 |
| 4,760,566 | 7/1988 | Kobayashi et al. | 369/48 |
| 4,821,254 | 4/1989 | Satoh et al. | 369/32 |
| 4,873,679 | 10/1989 | Murai et al. | 369/32 |
| 4,910,668 | 3/1990 | Okamoto et al. | 364/200 |
| 4,939,598 | 7/1990 | Kulakowski et al. | 369/59 |

Primary Examiner—Tommy Chin
Assistant Examiner—Khoi Truong
Attorney, Agent, or Firm—Spencer, Frank & Schneider

[57] ABSTRACT

A disc storage unit includes discs having surfaces with concentric tracks for storing data in sectors. Each sector has identification information including a physical address designating a particular disc surface, sector and track. The physical addresses are contiguous for one surface to another at a first or last sector in a radially outermost or innermost track, respectively. Heads are provided for reading and writing data from and onto the discs. The position of each head within a track is determined using servo information recorded between adjacent sectors. Address converting circuitry converts logical addresses from an external computer into physical addresses on the discs, including physical addresses which span a plurality of tracks located on both surfaces of a disc, when reading or writing data at logical addresses is commanded. Head selecting circuitry responds to the physical addresses by selecting each head corresponding to a surface of the disc on which the physical addresses are located. Head position controlling circuitry responds to the physical addresses by positioning each head selected, using the servo information, at each track associated with the physical addresses provided. Read/write circuitry reads and writes data from and onto each surface of each disc at the corresponding physical addresses provided.

1 Claim, 3 Drawing Sheets

DATA READ/WRITE SYSTEM FOR A DISC STORAGE UNIT

This application is a continuation of application Ser. No. 07/523,552, filed May 15th, 1990, now abandoned.

BACKGROUND OF THE INVENTION

1. Field of the Invention

The present invention relates to a data read/write system for a disc storage unit provided with servo information, such as a fixed disc storage unit, more particularly to a data read/write system for reading and writing data from and onto a sector in a track wherein a read/write head is displaced and positioned at a desired track while it is reading out servo information recorded on one or both surfaces of the disc, and a physical address is instructed in accordance with a logical address defined at the sector in the disc storage unit.

2. Description of the Prior Art

As is well known to those skilled in the art, there has always been a keen demand to increase storage capacity of a disc storage unit such as an external storage unit. In order to meet the demand, it is necessary that a number of tracks be defined on one or both surfaces of a hard disc. However, this leads to a reduction in the pitch between the tracks, which in turn causes errors in reading/writing even with a slight deviation in the position of the head. Recently, it has become a customary countermeasure to precisely position the head by closed loop control using servo information recorded on the disc or by a position encoder housed in an operating system for the disc.

In most cases, system for writing servo information is used called a servo-surface servo information system in which servo information is recorded on a specific surface of the disc. This system gives a counter result in that one of the surfaces of the disc, which are very precious, is occupied by servo information. However, subtle differences tend to occur between heads provided to respective disc surfaces due to such factors as mechanical errors and deviations in position of the heads from their normal position. Accordingly it is difficult to improve the accuracy of positioning of the heads beyond a certain degree by detecting deviation in position on a disc surface exclusively allotted to servo information and correcting the position of the head corresponding to another disc surface. The same is true for the system for positioning heads utilizing an encoder.

In order to solve the above-described problems, there has been used advantageously a so-called data-surface servo information system in which servo information is recorded on each disc surface for recording data. As for data-surface servo information systems there have been known a so-called concentrated servo information system in which servo information is recorded exclusively at one position in a peripheral or circumferential direction of a disc surface for recording data and a so-called built-in servo information system in which servo information is recorded dividedly so as to be distributed over a plurality of positions or between sectors.

Meanwhile, the area to which a head is to be positioned with reference to servo information and data reading or writing into is usually defined by a physical address which consist of a cylinder number, a head number and a sector number, which is a specific address system determined depending on how data are stored in a disc storage unit. However, since they must allow various combinations of different disc storage units with different physical address systems, computes usually give disc storage units instruction for defining an area for reading out and writing data from and into by a so-called logical address which is independent of the type of disc storage unit. The logical addresses consist of a number of sectors which are read/write units in the storage space of the disc storage unit and to which serial numbers are assigned. The disc storage unit initiates operations including head positioning and the like when it receives a logical or address range after converting it into a specific physical address range.

Referring to FIGS. 1A and 1B, which are each schematic views illustrating a disc surface for outlining addressing in a conventional data read/write system, the above-described intersector built-in servo information system and the conversion system in which logical addresses are converted into physical addresses as typical examples of the conventional read/write system will be briefly described.

On the two surfaces schematically shown in FIGS. 1A and 1B, there are shown a plurality of slender fan-shaped regions for servo information SI (eight in this example for convenience of illustration). Such servo information regions are arranged so as to wedge themselves in sectors g. Tens of sectors S are arranged in several hundreds of concentric tracks as shown in FIGS. 1A and 1B. Explanation of how to write servo information SI into the regions and the like will be made later hereinbelow with reference to FIG. 3.

Upon the positioning of a head above a specific track of one disc surface, the servo information SI written into the disc surface is read out via the head and an off-track amount is detected, defined as a deviation of the head from the center of the track, from the read-out signal. The head is controlled by closed loop control so that the off-track amount can be nulled. Therefore, there occurs no deviation in tracking based on mechanical errors between the heads. In this example, control of head position with reference to the servo information SI written into the respective intersector regions is continued during reading out and writing data from and into a sector S in a specific track on a specific disc surface.

In FIGS. 1A and 1B, the sectors S are assigned their own numbers which denote logical addresses instructed by the computer. The physical addresses on the side of the disc storage unit corresponding to the logical addresses consist of, for each disc surface, a cylinder number which is assigned, for example, from the outermost diameter track toward inner diameter tracks sequentially; a head number which is assigned corresponding to each disc surface; and a sector number which is assigned to a sector in each track on each disc surface. Each of the numbers starts from 0 for the sake of convenience. Usually, in the conventional system, the logical addresses instructed by the computer are converted into physical addresses in the disc storage unit as follows.

As shown in FIGS. 1A and 1B, the leading logical addresses 0 to 7 are converted sequentially to eight sectors in the radially outermost No. 0 track on a second disc surface with the head number 0, and subsequently as shown in FIG. 1B, the logical addresses 8 to 15 are converted into eight sectors in the radially outermost No. 0 track on a second disc surface with the head number 1.

When number of the disc surfaces is two, as in the above-described example, subsequent logical addresses 16 to 23 are converted into sectors in the track with the cylinder number 1 which is one track inward with respect to the radially outermost track on the disc surface with the head number 0 as shown in FIG. 1A, and further logical addresses 24 to 31 are convented into sectors in the track with the cylinder number 1 on the disc surface with the head number 1 shown in FIG. 1(B). Thereafter, similar conversion is performed sequentially. Assuming that the total number of sectors in a single disc surface is indicated by x, the last logical address is 2x−1 and is converted into address in the last sector in the radially innermost track on the disc surface with the head number 1 shown in FIG. 1B.

The conventional address conversion described above has an advantage that upon converting the contents of data information to be read out or written into, for example, from the logical addresses 0 to 7 to the ones 8 to 15, the operation can be continued by merely switching on or off the heads without changing the position thereof. That is, since the tracks on the same radial position in a plurality of disc surfaces form a cylinder, they are assigned the same cylinder number, and in order to make use of the above-described advantage, the logical addresses are sequentially converted into physical addresses in the tracks with the same cylinder number.

According to the above-described conventional read/write system, it is expected that of off-tracking of head a during its head/write action could be reduced by employing a built-in servo information system in which servo information is recorded on each disc surface. Also the amount of displacement of the head could be made as small as possible to reduce means access time of the device by using a kind of disc surface parallel addressing system in which a series of logical addresses are continuously converted into physical addresses with the same cylinder number as much as possible. However, it is necessary that mechanical precision of a head operating system be improved in its own way before such effect can be actually obtained, and a problem arises that when reducing the pitch between any adjacent tracks in order to increase storage capacity is contemplated it becomes increasingly difficult to increase the mechanical precision of the device accordingly.

Of factors affecting the mechanical precision of the device, the most important one is fluctuation in pitch precision of a head supported by a thin plate spring which would readily occur from head to head. It follows, therefore, that tracking errors occur upon the switching of the head and its takes a long time to correct such errors, resulting in that the effect of reducing the access time cannot be obtained virtually.

That is, in the above-described disc surface parallel addressing system, when data with a series of logical addresses is read or written, reading or writing the data from or into tracks on a different disc surface with the same cylinder number can be accomplished by merely switching heads. Therefore, it is natural to expect that the read/write operation can essentially be performed continuously. The above-described pitching problem may be considered as a mechanical fall down or inclination which would affect the radial position of the head over the disc surface, and fluctuation, if any, from head to head results in, when servo information is read out immediately after switching the head, excessive tracking error being detected therefrom and a reading/writing operation will no longer be continued as it is. Of course, the tracking error can be corrected immediately. However, the disc must be turned at least one before reading/writing can be initiated again, which prolongs the access time accordingly.

In practice, yawing of the head or the like occurs which causes a radial deviation in addition to the pitching problem, with the result that mechanical error increases and the advantage tends to be thereby off-set.

SUMMARY OF THE INVENTION

Taking into consideration the fact that it is difficult for the conventional systems to increase their mechanical precision to fully utilize their advantage, it is an object of the present invention to improve the performance, such as storage capacity of the disc storage unit, without a requiring a particularly high mechanical precision.

In order to achieve the above and other objects and ends, according to the present invention, the following measure is taken. That is, in a disc storage unit provided with servo information for determining the position of a head and which reads out or writes data from or into a sector with physical addresses by converting logical addresses instructed by a computer into the physical addresses, servo information is recorded at at least one position in a radial direction for each of disc surfaces on which data information is to be recorded, and after a continuous logical address designation over a plurality of tracks is converted into a continuous physical address designation on a predetermined disc surface corresponding to the designation the head is displaced and positioned sequentially at a track in response to the physical address designation with reference to the servo information, followed by reading out or writing the data from or into the sector in the track.

It is of course preferred that the servo information in the above construction be recorded over a plurality of positions distributed in a peripheral or circumferential direction on each disc surface of storing data in order to minimize the tracking error of the head upon reading or writing. Most preferred is to make the servo information in the form of the above-described intersector built-in servo information which is recorded on regions between the sectors. Conventional servo information of any type of system or mode can be used as the servo information in the present invention. However, it s preferred to adopt a so-called vast servo information in the case of the intersector built-in servo information in order to minimize the area of the region required for the recording thereof.

It is sometimes the case where continuous logical addresses designated by the computer extend over two or more disc surfaces. In this case, it is particularly preferred that the conversion of the logical addresses in the above-described construction into the physical ones be performed so that the physical address is switched from one disc surface to adjacent disc surface at the same head position in order to minimize the amount of displacement of the head and reduce mean access time accordingly.

As described above, in the conventional disc surface parallel addressing system, a series of continuous logical addresses are converted into a series of physical addresses with the same cylinder number as much as possible in order to reduce the amount of displacement of the head when it reads out or writes data information designated by the logical addresses. In this case, correction of tracking error is needed upon switching the head if the mechanical precision of the unit is insufficiently high. It follows from this that increasing narrowing of the pitch between any two adjacent tracks leads to relative increases in the tracking error taking a long time to correct. This results in an increase in the amount of displacement in contrast to an expected decrease therein.

Noticing the above, the present invention enables reduction of the time required for displacement of a head from one track to another to a level substantially shorter than a time required for the correction of position upon switching the head by adopting a disc surface serial addressing system in which continuous logical address designation extending over a plurality of tracks is converted into continuous physical address designation on a disc surface as in the above construction.

In other words, according to the conventional technique, it is necessary upon switching a head to correct the position of the head in the case where the pitch between tracks is narrowed unless the mechanical precision of the unit is increased accordingly. In contrast thereto, in the present invention, the time required for the positioning of the head can be decreased substantially as compared with the time conventionally required. Therefore, the present invention makes it possible to narrow the pitch between the tracks in order to increase the storage capacity of the unit without requiring improvement in the mechanical precision of the construction components.

However, if the pitch between the tracks is narrowed, the tracking precision of the head must be increased accordingly and therefore the present invention is designed so that data information is read from or written into tracks in a mode that the tracking error can be minimized, by recording servo information at at least one position in a peripheral direction for each disc surface on which data information is to be recorded, as described in the above-described construction, and then positioning the head with reference to the servo information recorded on the same disc surface as the data information upon its reading or writing. Therefore, reading out or writing data information from or into a desired track can be carried out in a mode in which the head position is controlled precisely with reference to the servo information recorded on the same disc surface as that on which the data information is recorded, and as a result precise or accurate read/write operation is always assured even when the pitch between the tracks is narrowed in order to increase the storage capacity of the unit or a head mechanism is used which does not have a so high mechanical precision.

Although the displacement of the head is necessary when the operation of reading or writing data information is moved from one track to another by employing the above-described disc surface serial addressing system, the amount of displacement of the head is always below the pitch between any two adjacent tracks, and therefore the time required for the positioning of the head can be shortened to a level much shorter than the required as in the conventional disc surface parallel addressing system, for correction of the head position accompanying the switching of the head where the pitch between the tracks is narrow or the mechanical precision of the head mechanism is no high, thus improving the performance of the disc storage unit.

With the above-described features, the present invention makes it possible to increase the storage capacity of the disc storage unit so as to exceed the limit of a conventional one by narrowing the pitch between the tracks without improving the mechanical precision of the mechanical parts of the unit. Besides, the present invention enables the simplification of the construction of bearings and spindle mortar for driving the disc in the head mechanism, the use of a casing made of a plastic for the simplification of assembly of the unit, thus effectively rationalizing the mechanism parts of the disc storage unit.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1A:
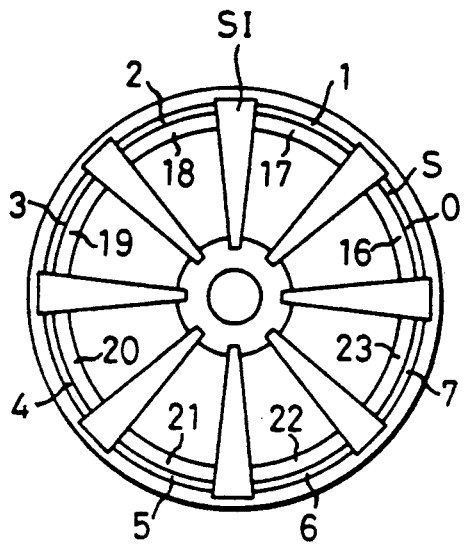
FIGS. 1A and 1B each show a diagram of a disc surface showing procedures of addressing according to a conventional data read/write system.
Figure 1B:
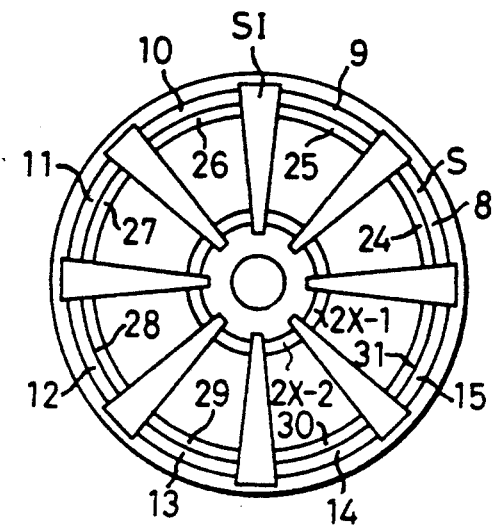
Figure 4A:
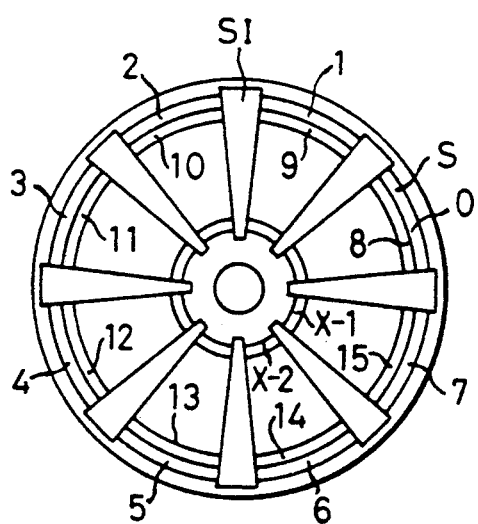
FIGS. 4A and 4B each show a diagram oil a disc surface showing procedures of addressing according to an embodiment of the present invention corresponding to the disc surface shown in FIGS. 1A and 1B.
Figure 4B:
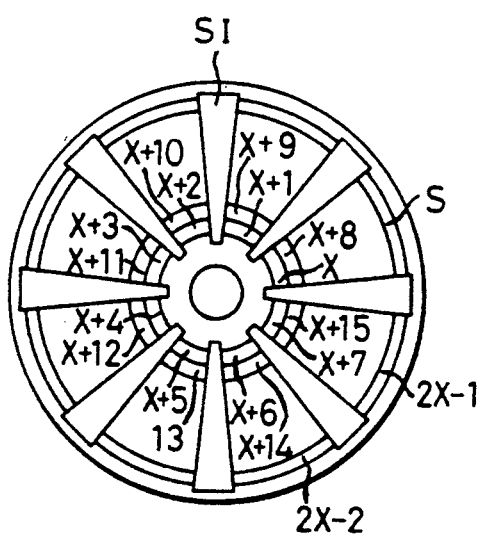
Figure 2:
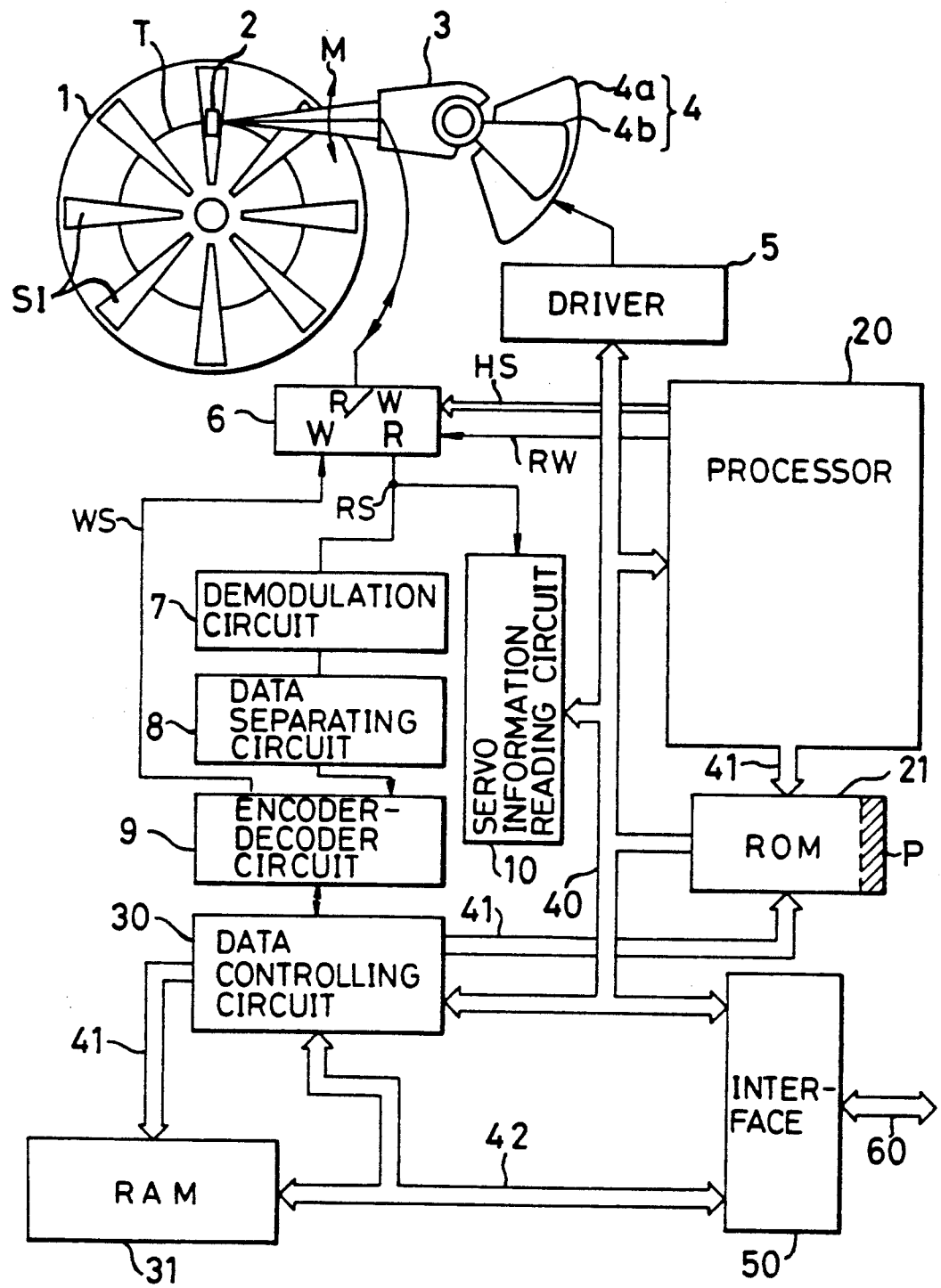
FIG. 2 is a block diagram showing an embodiment of a disc storage unit embodying a data read/write system in accordance with the present invention together with circuits therefor.
Figure 3:
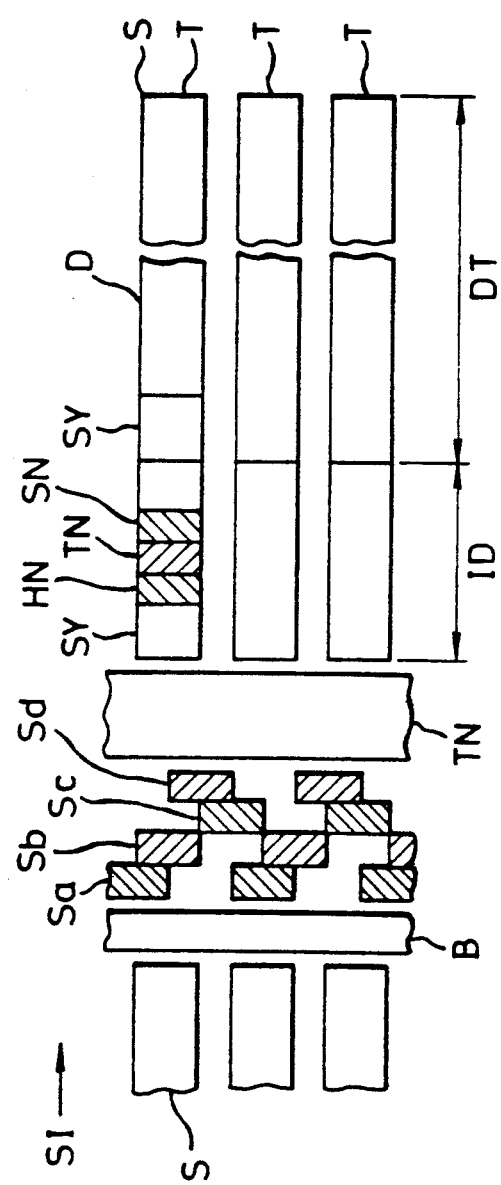
FIG. 3 is a partial development view showing a part of a disc surface of explaining an example of the recording mode of servo information according to the present invention.

FIG. 2 shows one embodiment of an arrangement of a disc storage unit suitable for implementing a data read/write system in accordance with the present invention. In this embodiment, servo information of the above-described intersector built-in system is employed. FIG. 3 illustrates in detail the servo information. Each of FIGS. 4A and 4B show procedures of addressing of the disc surface serial system in a similar manner as FIGS. 1A and 1B.

On one surface of disc 1, which is shown at an upper part on the left side of FIG. 2, there are shown a track T and a plurality of fan-shaped regions for servo information SI which are arranged radially so as to partially interrupt the tracks in the circumferential direction. In FIG. 2, the number of the fan-shaped regions is eight. In practice, however, this number is the same as the number of the sectors in the track, and usually several tens of fan-shaped regions are provided. A head 2 is supported via a thin plate spring by an arm 3 which rocks in a direction indicated by an arrow M in this embodiment. The position of the arm 3 in the radial direction is controlled by an actuator 4 of a type using a voice coil motor consisting of a stator 4a and a rotor 4b. A driver 5 is provided for driving the actuator 4. A plurality of heads 2 in the disc storage unit are connected to read/-write circuit 6. Of the heads, the one which is designated by a head selection instruction HS from a processor 20 is put in a mode of reading or writing data in response to the contents of a read/write instruction RW also from processor 20, as is the case of a conventional disc unit storage unit. A read out signal RS outputted from a read out output R of the read/write circuit 6 is sent via a demodulation circuit 7 and a data separating circuit 8 to an encoder-decoder circuit 9. On the other band, a write signal WS is supplied by the encoder-decoder circuit 9 to a write input W of the read/write circuit 6.

The read out signal RS is also supplied to a servo information reading circuit 10 so that the read-out portion of the servo information SI contained therein can be read out. Microprocessor 20 is incorporated in the disc storage unit for overall control of the components therein, and microprocessor 20 is connected to the servo information reading circuit 10 via an internal bus 40 which functions as both an address but and a data bus simultaneously. The microprocessor 20 is connected by address but 41 to a ROM 21 for storing recorded programs therein and ROM 21 also is connected to the internal bus 40.

A data controlling circuit 30 connected to the microprocessor 20 via the internal bus 40 is itself a simple processor. RAM 31 is connected to the data control circuit 30 via the address bus 41. As is the case of a conventional disc storage unit, the data controlling circuit 30 receives serially the read-out signal decoded by the encoder-decoder circuit 9 and converts it into parallel data which are stored first in the RAM 31, followed by supplying the parallel data to a data bus 42 and conversely reading the data on the data bus 42 in a parallel mode and converting it into a serial write signal, and then supplying it to to the read/write circuit 6 via the encoder-decoder circuit 9 in an encoded mode. The internal bus 40 and the data bus 42 are connected to or associated with an external bus 60 for a computer (not shown) via an interface circuit 50 of SCSI system, for example. The data controlling circuit 30 is separately connected to the ROM 21 for the microprocessor 20 so that the programs and basic data information contained therein can be utilized. As is shown in FIG. 2, the microprocessor 20 supplies a driving instruction to the driver 5 for the actuator 4 via the internal bus 40 and also sends the above-described two instructions (HS and RW) for the read/write circuit 6.

FIG. 3 is a partial development view showing a part of a disc surface to explain an example of the mode of writing intersector built-in servo information SI between the sectors S in a track T. In this embodiment, the servo information SI is a so-called vast servo type which consists of four servo information regions Sa, Sb, Sc and Sd arranged in the circumferential direction of the disc 1. As is described in detail in U.S. Pat. No. 4,669,004, the contents of the four servo information regions are written into the respective surfaces of the disc 1 at different positions thereof in radially opposite directions with respect to the center line of a track T in a simple repetitive manner such that each of them has a content consisting of several repetitive patterns and that a deviation of the head from the center line of the track, or off-track, can be detected based on the magnitude of the vast signal which is obtained by reading out the contents of each servo information portion. On the left hand side of the servo information regions, there is provided a marker B for detecting the servo information SI, which indicates that the servo information regions follow it. Usually, the marker B is made as a region which is blank, that, is no data has content. On the right hand side of the servo information portion, there is written a track number TN in the form of a unique code so that it can be read out during a so-called seeking operation in which the head is displaced or seeds.

The servo information reading circuit 10 shown in FIG. 2 is contemplated to read out the contents of the servo information SI which consists of the marker B, the servo information regions Sa to Sd and the track number TN. The circuit 10 detects the marker B to initiate the reading out and detects the respective magnitudes of the four vast signals derived from the servo information regions Sa to Sd, and if desired, also reads out the track number TN and then supplies the information to processor 20 via internal bus 40.

Next, the overall construction of the sectors S on the track T in accordance with the present invention will be described by referring mainly to one of them. As is the case in a conventional disc storage unit, a sector S consists of an identification portion ID and a data portion DT, and synchronization data SY are provided at the respective beginning portions thereof. The identification portion ID contains the physical addresses, i.e., the head number HN, the track number TN and selector number SN, of the sector and the data portion DT contains data D of using 256 to 1024 bytes together with error codes. Of course, the head number HN denotes the number of the disc and the track number TN corresponds to the cylinder number as conventionally used.

FIGS. 4A and 4B show how to convert the logical addresses into the physical addresses in the same manner as previously explained in FIG. 1 with respect to the case where two disc surfaces are used. In this case, it is assumed that the servo information SI is written in eight component portions on each disc surface for the ease of illustration. FIG. 4A shows the disc surface for which the head number HN is 0 and the logical addresses 0 to 7 designated by a computer (not shown) are sequentially converted into the eight sectors S in the radially outermost track with the track number TN=0 as shown in FIG. 4A, and the accompanying logical addresses 8 to 15 are sequentially converted into the eight sectors in the track with the track number TN=1.

In the same manner as above, continuous logical addresses are sequentially converted into the sectors arranged in the inner tracks in the radial direction. Assuming that the total number of sectors of one disc surface is x as is the case previously explained, the logical address x−1 is converted into the last sector in the radially innermost track. The subsequent logical addresses are all converted into the sectors in the disc surface with the head number HN=1 shown in FIG. 4B. In this embodiment, the first logical address x on this surface is converted into the top sector in the radially innermost track of this disc surface as shown in FIG. 4B.

As shown in FIG. 4B, of the logical addresses x−1 et seq., every eight logical addresses are converted into sectors in the tracks sequentially from the sector which is present by one track outer in the radial direction than the radially innermost track toward the sector which is the radially outermost track in the disc surface with the head number 1. The last logical address 2x−1 is converted into the last sector in the radially outermost track. It follows from this that when the disc surface is switched in response to the movement of the logical address from x −1 to x, it is only necessary that the read/write action be switched from the head No. 0 to the head No. 1, without moving the head actually.

Next, explanation of the overall operation of the system in accordance with the present invention will follow the description of the above-described construction of the disc storage unit for practicing the present invention. The data read/write instruction RW derived from a computer (not shown) is supplied to the microprocessor 20 via the external bus 60, the interface circuit 50 and the internal bus 40. The read/write instruction always includes designation of a read instruction or a write instruction in addition to the top logical address of the data, and therefore, the processor 20 first converts the logical addresses into the physical addresses by the address converting means P stored in the ROM.

Now, assuming that the number of tracks on one of the disc surfaces is Nt, and that the number of sectors in one track is Ns, as will be readily understood, the designated logical addresses can easily be converted into physical addresses by defining as the head number HN an integer part of a value obtained by dividing the value of the designated logical address by Nt·Ns, further defining as the track number TN an integer part of a value obtained by dividing the remainder of the division of the designated logical address by Nt·Ns by Ns and also defining the surplus of the second division as the sector number TS.

The processor 20 issues the head number HN contained in the converted physical address as a head selection instruction HS and supplies it to the read/write circuit 6, and performs a so-called seek operation in which the processor 20 reads out the track number portion TN in the servo information SI via the servo information reading circuit 10, as is the case of a conventional disc storage unit, and moves the head 2 in the vicinity of the track with the track number TN in the converted physical address while issuing an instruction for operation and supplying it to the drive circuit 5 of the actuator 4. Immediately after completion of the seek operation a read/write instruction RW is supplied to the read/write circuit 6 in response to the instruction given by a computer (not shown) so as to begin a data read/write action.

In this case, the processor 20 receives the magnitude of the vast signal obtained by reading the four servo information regions Sa to Sd in the servo information SI from the servo information reading circuit 10, as is the case of a conventional disc storage unit, and a calculates on off-track amount, and then while controlling the position of the head 2 via the actuator 4 in a closed loop control mode so that the off-track amount falls within a predetermined allowance, starts read/write operation in association with the internal bus 40 on the condition that the off-track amount becomes within the predetermined allowance.

The reading or writing of data is usually performed such that the content of the data for one track is read or written continuously in one operation. However, in the present invention, the reading or writing data from or into a sector in a track is performed in a closed loop control mode with reference to preceding servo information on the same disc surface, resulting in that accurate reading out or writing can always be carried out even when the pitch between adjacent tracks is narrow and the mechanical precision of the head mechanism is not high. Of course, the reading or writing of data is carried out within the logical addresses designated by a computer (not shown) or until the last designated logical address is reached.

When switching tracks from which data information is to be read from or written into while continuing the above-described operation, the processor 20 operates the actuator 4 to change the position of the head 2 by one intertrack pitch radially inwardly or outwardly and starts reading or writing data from or into a new track after confirming that the off-track amount has become within the predetermined allowance with reference to the servo information. As stated above, the time required for movement of the head by one intertrack pitch according to the present invention is shorter than the time required conventionally for correction of the position of the head after switching heads in the case where the intertrack pitch is narrow, and therefore, reading out or writing data information from or into new tracks can be carried out faster than before.

Communication of data to be read or written with the computer in the present invention is the same as the conventional technique, and more specifically, the data read out by the data controlling circuit 30 is first stored in RAM 31 and then supplied to the computer via the data bus 42, the interface circuit 50 and the external bus 60, and on the other hand the data to be written is first stored in RAM 31 and supplied in the reverse direction to the data controlling circuit 30 and the like to obtain the write signal WS for disc 1.

While the description of the embodiments of the present invention has been completed, it is to be understood that the present invention is not limited to the above-described embodiments and that various modifications can be effected within the true spirit of the present invention. For instance, although description of the above embodiments has been made as to the case where two disc surfaces are used for convenience, it is rather common to use four or more disc surfaces in practice. The servo information is not limited to the vast servo system type used in the above-described embodiments and any known type of servo information can be used in the present invention as the case may be. The number of the regions where servo information is to be written should be selected appropriately from disc to disc in response to the accuracy of reading or writing operations or the degree of the mechanical precision of the head mechanism. For instance, there can be used only one region but with as high as possible a storage capacity or that of intersector built-in mode as used in the embodiments described above in order to increase the tracking accuracy upon reading or writing data.

The construction of the disc storage unit used in the above-described embodiments is merely an example and those having a construction such as a type or model considerably different from that used in the embodiments can also be used in the present invention in an appropriate manner. The practical manner of conversion of the logical addresses into the physical addresses is to be adapted to the construction of the disc storage unit, and various variations may be made in practice.

The invention has been described in detail with respect to embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disc storage unit, comprising:
   (1) a plurality of disc surfaces, each disc surface having a plurality of concentric tracks for storing data, each track being divided into a plurality of sectors, servo information being recorded between adjacent sectors, and each sector having identification information including a physical address designating a particular disc surface, sector and track;
   (2) a plurality of heads, each of which is disposed to adjacent a respective one of said disc surfaces, for reading and writing data from and onto the corresponding disc surface;

(3) address converting means for converting continuous logical addresses over a plurality of tracks designated by an external computer into continuous physical addresses on one disc surface when reading or writing data at logical addresses is commanded by the external computer, the converted continuous physical addresses extending over a series of tracks in the radial direction on the disc surface and being switchable to another disc surface at radially innermost or outermost tracks;

(4) head selecting means, responsive to the physical addresses from said address converting means, for selecting one of said heads corresponding to the disc surface designated with the converted physical addresses;

(5) head position controlling means, responsive to the converted physical addresses from said address converting means, for positioning the head selected by said head selecting means, sequentially at each track designated with the converted physical addresses; and (6) read/write means for reading and writing data from and onto each sector designated with the converted physical addresses provided by said address converting means through the head positioned by said head position controlling means.

* * * * *